United States Patent [19]

Saito et al.

[11] Patent Number: 4,625,247

[45] Date of Patent: Nov. 25, 1986

[54] DISK DRIVE

[75] Inventors: Kengo Saito, Miyagi; Yasunori Ohtsu, Tokyo; Isao Akahira; Makoto Inoue, both of Miyagi, all of Japan

[73] Assignee: Sony Corporation, Tokyo, Japan

[21] Appl. No.: 776,852

[22] Filed: Sep. 17, 1985

[30] Foreign Application Priority Data

Sep. 22, 1984 [JP] Japan .................... 59-199269

[51] Int. Cl.4 .............. G11B 5/012; G11B 19/20
[52] U.S. Cl. ............................ 360/71; 360/73
[58] Field of Search ....................... 360/71, 73

[56] References Cited

U.S. PATENT DOCUMENTS 4,376,293 3/1983 Teramura et al. .............. 360/71

Primary Examiner—George G. Stellar
Attorney, Agent, or Firm—Hill, Van Santen, Steadman & Simpson

[57] ABSTRACT

In order to eliminate undesirable slippage of the disk (1) on the turntable (10) of the disk drive which might occur upon effecting driving connection between the turntable and the disk, the rotation speed of the turntable is reduced to a level considerably lower than the regular speed for a predetermined short period of time upon starting to rotate the turntable.

4 Claims, 5 Drawing Figures

DISK DRIVE

BACKGROUND OF THE INVENTION

1. Field of the Invention

The present invention relates in general to a disk drive unit such as a drive for microfloppy disks, and more particularly to a disk drive which is designed to drive a disk housed in a disk cassette.

2. Description of the Prior Art

Hitherto, various kinds of disk drives have been proposed and put into practical use. Some of them are of a type which drives a disk housed in a disk cassette. However, some drives of this type have suffered from the drawback that during operation, the centering of the disk relative to a turntable on which the disk rests is often disrupted, causing tracking error of the read/write heads of the drive.

OBJECTS OF THE PRESENT INVENTION

It is therefore an object of the present invention to provide an improved disk drive for use with a cassette-housed disk (viz., cassette disk), which ensures accurate centering of the disk relative to the turntable.

SUMMARY OF THE INVENTION

According to the present invention, a disk drive comprises a turntable having concentrically and eccentrically located pins which are, upon setting the disk onto the turntable, inserted respectively into concentrically and eccentrically located holes in the disk, the eccentrically located pin being, upon rotation of the turntable, brought into contact with the forward edge of the eccentrically located hole, thus achieving a drive connection between the turntable and the disk, biasing means for biasing the eccentrically located pin radially outward against the outer edge of the eccentrically located hole thus centering the disk on the turntable, an electric motor for driving the turntable upon energization thereof, and an electric circuit for energizing the electric motor so as to drive the turntable at a predetermined constant speed, the electric circuit being so constructed as to reduce the rotation speed of the electric motor and thus the speed of the turntable to a level considerably lower than the predetermined speed within a given short period of time after starting to rotate the turntable.

BRIEF DESCRIPTION OF THE DRAWINGS

Other objects and advantages of the present invention will become apparent from the following description when taken in conjunction with the accompanying drawings, in which.

DETAILED DESCRIPTION OF THE PREFERRED EMBODIMENT

A preferred embodiment of a disk drive according to the invention will be described with reference to FIGS. 1 to 3.

Figure 1:
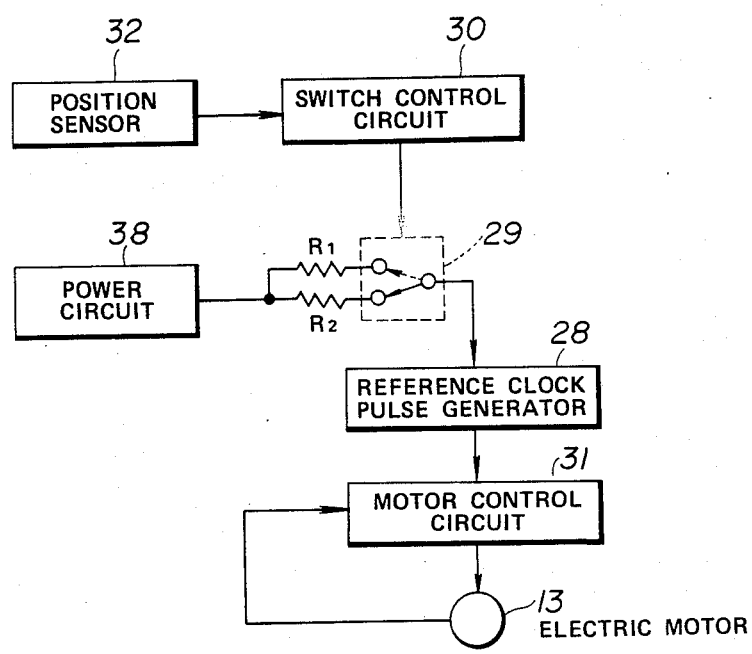
FIG. 1 is a perspective view of a turntable onto which a disk cassette has been placed for use.
Figure 2:
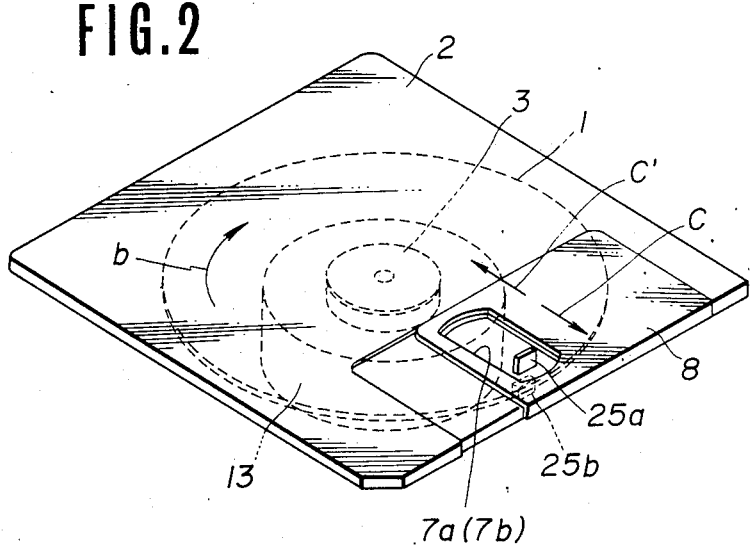
FIG. 2 is a cross-sectional view through an essential part of the disk drive according to the invention and a disk cassette.
Figure 3:
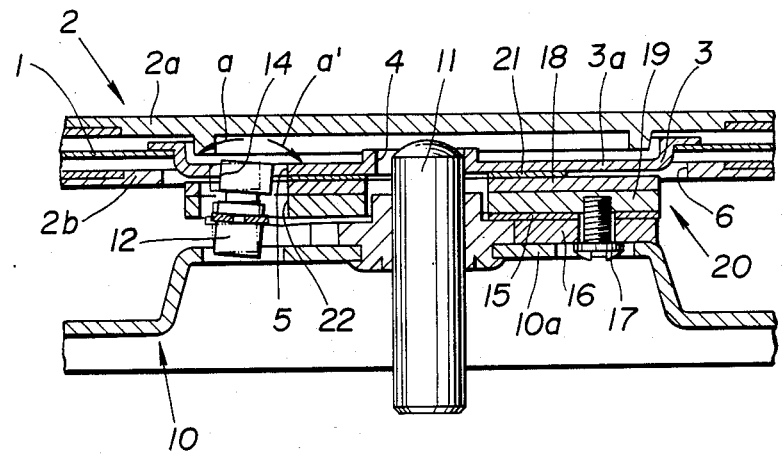
FIG. 3 is a plan view of the essential part of the inventive disk drive and the disk cassette.

FIGS. 1 to 3 show a disk drive for driving a microfloppy disk. In the illustrated example, the floppy disk 1 is of the double-sided type and is rotatably housed within a rigid disk cassette 2 which comprises square upper and lower halves 2a and 2b. As can be seen in FIG. 2, the central exposed portion of the disk 1 has a circular metal plate 3 secured thereto. The circular metal plate 3 has a central hole 4 and a drive pin engaging hole 5 at a point distant from the center hole 4. As is shown in FIG. 3, the center hole 4 is square in shape, while the engaging hole 5 is rectangular. As is shown in FIG. 2, the lower half 2b of the cassette 2 has a circular opening 6 into which a deck 3a of the circular metal plate 3 projects with some annular clearance left therebetween. The upper and lower halves 2a and 2b of the disk cassette 2 have matching elongated apertures 7a and 7b. Upon operation of the drive, known read/write heads 25a and 25b (see FIG. 1) are inserted into the apertures 7a and 7b and contact opposite faces of the disk 1. The apertures 7a and 7b can be covered by a shutter 8 which is biased in the direction of covering the apertures 7a and 7b.

Referring back to FIG. 2, a turntable 10 of the disk drive is shown with the disk cassette 2 in place. The turntable 10 has a raised circular deck 10a which is concentric with the major portion of the turntable 10. A central shaft 11 is coaxially secured to the deck 10a through an annular connector (no numeral). As will become clear hereinafter, a drive pin 12 is pivotably connected to the deck 10a at a point distant from the center of the deck 10a.

The central shaft 11 is part of the drive shaft of an electric motor 13, thus providing a so-called direct-drive connection between the turntable 10 and the motor 13. A rotatable ring 14 which is free to rotate about the axis of the drive pin 12, is mounted on the upper end of the drive pin 12.

A circular spring plate 15 is used to retain the drive pin 12 on the circular deck 10a of the turntable 10. The spring plate 15 is secured by means of a plurality of bolts 17 to the deck 10a via a spacer 16. As is shown in FIGS. 2 and 3, the center of the drive pin 12 is secured to a so-called bridge structure 15a of the spring plate 15, so that the drive pin 12 is free to pivot about a horizontal, non-radial axis. When at rest, the drive pin 12 stands with its axis parallel with the axis of the central shaft 11. Due to the resiliency of the bridge structure 15a of the spring plate 15, the drive pin 12 is free to swing radially, that is, in the directions indicated by the arrow "a" and "a'" in FIG. 3.

A magnetic chuck 20 is also secured to the spring plate 15 by the bolts 17. The magnetic chuck 20 comprises a yoke plate 19 and a magnetic plate 18. A lubricant sheet 21 made of a non-magnetic material is attached to the magnetic plate 18. As shown in FIG. 2, the magnetic chuck 20 has an aperture 22 through which the top (viz., the portion about which the rotatable ring 14 is disposed) of the drive pin 12 protrudes upwards as viewed in the drawing.

When the disk cassette 2 is to be inserted into the disk drive, the cassette 2 is put on the turntable 10 with the shutter 8 opened. At first, the central shaft 11 of the turntable 10 is inserted into the central hole 4 of the disk 1 while the drive pin 12 lies at some random location about the center shaft 11, for example, at the position labelled $P_1$ in FIG. 3. Under these conditions, the drive pin 12 is forced to pivot toward the horizontal with its head in contact with the lower surface of the circular metal plate 3 of the disk 1. Thereafter, the read/write heads 25a and 25b of the drive move into the apertures 7a and 7b of the cassette 2 and contact the surfaces of the disk 1. By the provision of the magnetic chuck 20, the setting of the circular metal plate 3 and thus the entire of the disk 1 onto the turntable 10 is tightly achieved.

The turntable 10 is then driven to rotate at 600 rpm in the direction of the arrow "b" by energizing the electric motor 13. The upper half of the drive pin 12 slides along the lower surface of the circular metal plate 3 of the disk 1 and slips into the engaging hole 5 of the same. The position of the drive pin 12 which has just slipped into the engaging hole 5 is indicated by reference $P_2$ in FIG. 3. As the turntable 10 continues to turn, the drive pin 12 moves to a driving position labelled $P_3$ where it contacts both the forward and outward edges 5a and 5b of the engaging hole 5 of the circular metal plate 3, thereby urging the disk 1 to turn in the same direction as the turntable 10. In this driving position, adjacent sides 4a and 4b of the square central hole 4 of the disk 1 are both held in contact with the central shaft 11, thereby centering the disk 1 on the turntable 10. As the disk 1 turns, the read/write heads 25a and 25b of the associated disk drive slide radially outwards and inwards (that is, in the directions of the arrows "c" and "c'" in FIG. 1) along the apertures 7a and 7b so as to read and/or write data on the disk 1.

However, disk drives of the type described above may suffer drawbacks originating from the significant force of impact when the drive pin 12 is brought into contact with the forward edge 5a of the engaging hole 5. That is, when, after slipping into the engaging hole 5, the drive pin 12 comes into contact with or abuts the forward edge 5a of the hole 5, the disk 1 tends to slip across the turntable 10 in the forward direction (that is in the direction of the arrow "b" in FIG. 3). This slippage tends to pull the edges 4a or 4b of the square central hole 4 of the disk 1 away from the central shaft 11 of the turntable 10, thereby preventing the disk 1 from being centered on the turntable 10. This miscentering sometimes brings about tracking errors of the read/write heads 25a and 5b of the disk drive.

Figure 4:
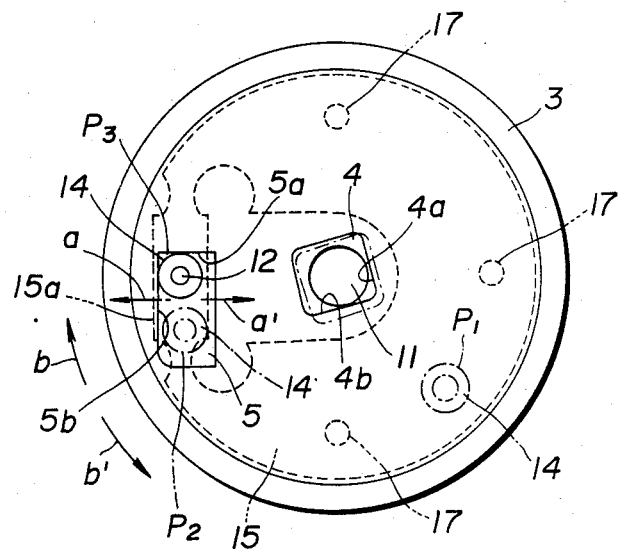
FIG. 4 is a graph of the friction characteristics of three commercially available floppy disks when use in the previously proposed disk drive.

Several experiments have been carried out to find a solution to the disk slippage encountered in the disk drive described above. The results of one experiment are shown in FIG. 4, which plots the characteristics of three commercially available disks A, B and C with different coefficients of friction in terms of the relationship between the rotation speed (R) of the disk and the load torque (L.T) applied thereto. The load torque represents the sum of the frictional forces between the disk and the two heads 25a and 25b and the frictional force between the disk and the inner surfaces of the disk cassette. As can be understood from this graph, the load torque applied to the disk decreases as the rotation speed of the disk increases. When, for example, the rotation speed of the disk is about 300 rpm, all the disks A, B and C satisfy the critical load torque (C.L.T: 10 g.cm) which prevents the undesirable slippage of the disk on the turntable 10, while, when the rotation speed of the disk is about 600 rpm, the disks B and C fail to satisfy the critical value of 10 g.cm. Thus, it is believed that if the drive pin 12 of the turntable 10 collides with the forward edge 5a of the engaging hole 5 of the disk 1 at a speed lower than 300 rpm, the undesirable slippage of the disk 1 will not occur.

An additional aspect of the present invention is designed to put the above-mentioned consideration into practice. As will become clear as the description proceeds, in accordance with the present invention, the disk drive is controlled in such a manner that as the turntable starts to rotate, its speed is held to a lower level to prevent slippage of the disk on the turntable and thereafter the speed is increased to a normal, higher level to allow normal use of the disk.

Figure 5:
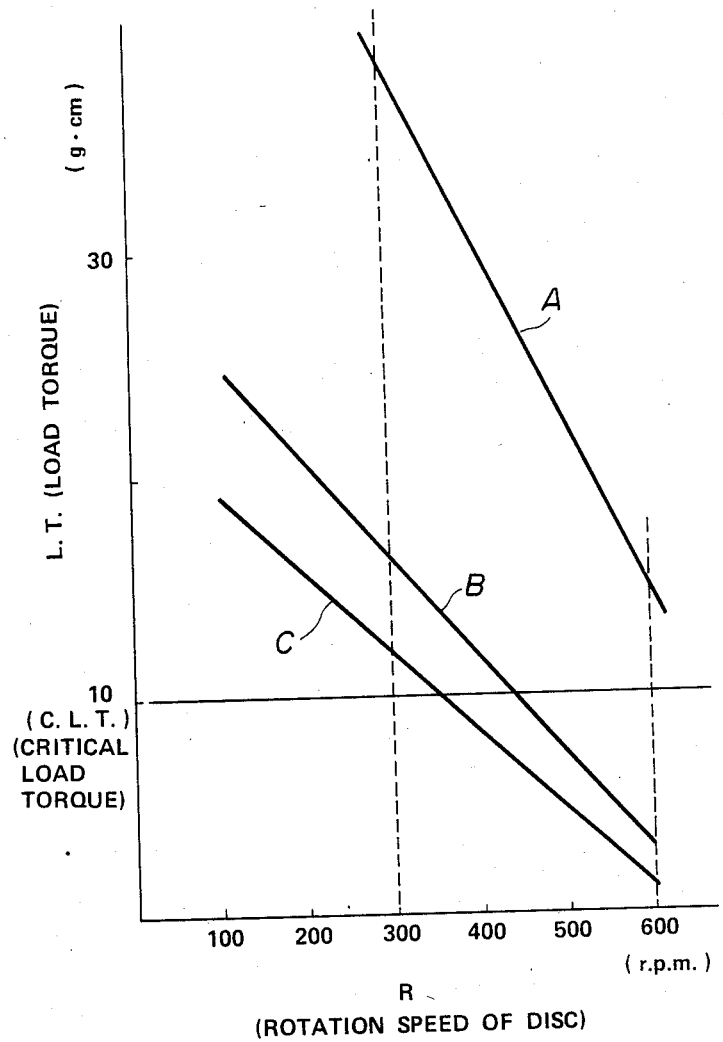
FIG. 5 is a block diagram of a control circuit for the disk drive according to the present invention.

FIG. 5 shows a control circuit for the disk drive according to the present invention. The control circuit comprises a reference clock pulse generator 28 to which is connected a power circuit 33 through a switch 29. The switch 29 is connected to parallelly connected resistors $R_1$ and $R_2$ ($R_1 > R_2$) so as to change, by switching between the resistors $R_1$, $R_2$, the reference voltage applied to the pulse generator 28. The switching operation of the switch 29 is effected by a control signal issued by a switch control circuit 30. The reference clock pulse generator 28 is connected to a motor control circuit 31 by which the electric motor 13 (which drives the turntable 10 directly) is controlled. The switch 29 selects one of two frequencies for the reference clock pulses fed to the motor control circuit 31, and thus selects one of two rotation speeds for the electric motor 13.

In the illustrated embodiment of the invention, when the switch 29 assumes its second position in which it connects the higher resistor $R_2$ (viz., the position indicated by a solid switch arm), the frequency of the pulses sent to the motor control circuit 31 is increased thus increasing the rotation speed of the electric motor 13, for example, to 600 rpm, which is the regular speed of the disk drive. On the other hand, when the switch 29 is in its first position in which it connects in the lower resistor $R_1$ (viz., the position indicated by a dotted switch arm), the frequency of the pulses is reduced, so that the rotation speed of the motor 13 is decreased, for example, to about 200 rpm to 300 rpm, preferably around 250 rpm.

When the disk 1 in the disk cassette 2 is initially set on the turntable 10 of the disk drive in the manner described above, a conventional sensor 32 issues a signal indicating the presence of the disk 1. Upon receiving this signal, the switch control circuit 30 actuates the switch 29 to its first position. Thus, the electric motor 13 (viz., the turntable 10) starts to rotate at the lower speed, for example, 250 rpm. After a given period of time (for example, longer than 200 milliseconds), a timer means in the switch control circuit 30 causes the switch 29 to assume its second position. It is to be noted that during this short period, the drive pin 12 must engage the forward edge 5a of the engaging hole 5 of the disk 1, and for the reasons given above, the collision does not induce undesirable slippage of the disk 1 on the turntable 10. When the switch 29 assumes the second position, the rotation speed of the turntable 10 changes to the higher level, for example 600 rpm, and thereafter, this rotation speed remains constant during operation of the disk drive.

As can be understood from the above description, in accordance with the present invention, undesirable slippage of the disk 1 on the turntable 10 is prevented by the provision of the initial stage of rotation of the disk drive during which the rotation speed of the turntable 10 is held to a relatively low level. Thus, tracking error of the read/write heads 25a and 25b is prevented or at least minimized.

What is claimed is:

1. A disk drive comprising a turntable having concentrically and eccentrically located pins which are, upon setting the disk onto said turntable, inserted respectively into concentrically and eccentrically located holes in the disk, the eccentically located pin being, upon rotation of said turntable, brought into contact with the forward edge of the eccentrically located hole, thus achieving a drive connection between said turntable and said disk; biasing means for biasing said eccentrically located pin radially outward against the outer edge of the eccentrically located hole thus centering the disk on said turntable; an electric motor for driving said turntable upon energization thereof; and an electric circuit for energizing said electric motor so as to drive said turntable at a predetermined constant speed, said electric circuit being so constructed as to reduce the rotation speed of said electric motor and thus the speed of said turntable to a level considerably lower than the predetermined speed within a given short period of time after starting to rotate said turntable.

2. A disk drive as claimed in claim 1, wherein said electric circuit reduces the speed of said turntable to a level below approximately 300 rpm, and thereafter increases the speed of the turntable to approximately 600 rpm.

3. A disk drive as claimed in claim 2, wherein said given short period of time is longer than approximately 200 milliseconds.

4. A disk drive as claimed in claim 3, wherein said electric circuit comprises a reference clock pulse generator (28) connected to a power supply circuit by way of a switch (29) which switches between higher- and lower-resistance resistors (R2, R1) connected in parallel to said switch; a switch control circuit (30) which issues a signal for actuating said switch; and a motor control circuit (31) by which the electric motor is directly controlled, said electric circuit being so arranged that when said switch is actuated to connect said higher resistor, the frequency of pulses supplied from said pulse generator to the motor control circuit is increased, thereby controlling the rotation speed of the electric motor to a higher level, while, when the switch is actuated so as to connect said lower resistor, the frequency of the pulses supplied to the motor control circuit is decreased, thereby controlling the rotation speed of the motor to a lower level.

* * * * *